United States Patent [19]

Corcoran

[11] 4,383,457

[45] May 17, 1983

[54] WORK SUPPORT AND DRIVE FOR ELONGATE SLENDER PARTS

[75] Inventor: Thomas J. Corcoran, Troy, Mich.

[73] Assignee: Snyder Corporation, Detroit, Mich.

[21] Appl. No.: 220,991

[22] Filed: Dec. 29, 1980

[51] Int. Cl.³ .................. B23B 1/00; B23B 33/00
[52] U.S. Cl. .................................. 82/1 C; 82/2.5; 82/40 R; 82/40 A
[58] Field of Search .............. 82/2.5, 2.7, 9, 40 R, 82/40 A, 45; 279/1 L; 51/237 CS, 237 R

[56] References Cited

U.S. PATENT DOCUMENTS

| | | | |
|---|---|---|---|
| 803,116 | 10/1905 | Lewis | 82/40 A |
| 1,617,403 | 2/1927 | Lovely | 82/40 A |
| 2,576,497 | 11/1951 | Austin, Sr. et al. | 82/40 R |
| 2,927,703 | 3/1960 | Rainey et al. | 82/2.5 |
| 3,101,019 | 8/1963 | LeLan | 82/2.5 |
| 3,926,078 | 12/1975 | Ishizuka et al. | 82/2.5 |
| 3,990,133 | 11/1976 | Schalles et al. | 82/2.5 |
| 4,064,774 | 12/1977 | Maddock | 82/45 |

Primary Examiner—Leonidas Vlachos
Attorney, Agent, or Firm—Barnes, Kisselle, Raisch, Choate, Whittemore & Hulbert

[57] ABSTRACT

A work support and drive chuck for slender, elongate work parts which are to be moved in a transfer line in a direction transverse to their axis in a lift and carry motion, for example, from one work station to the next for various machining or grinding operations. The chuck and center are retractable to a work clearance position and them movable to engage the center and to swallow a good portion of the part in a chuck support which grips the part at or near the center to support the part in areas where machining pressure will be applied. The chucks can be positioned at the part locating stations so that each end of a part can be properly machined but at different stations along the transfer line.

12 Claims, 3 Drawing Figures

:::page 1
WORK SUPPORT AND DRIVE FOR ELONGATE SLENDER PARTS

FIELD OF INVENTION

A work support and drive for machining or grinding an elongate slender workpiece in an automation line.

BACKGROUND OF THE INVENTION

The machining or grinding of elongate and slender parts has been a longstanding problem. The pressure of a cutting tool or a grinding wheel near the middle of a rotating part supported at the respective ends on centers will cause a bending of the part and prevent an accurate removal of metal. Accordingly, work supports have been provided on lathes to support the middle of a long part while it is being machined.

However, in a transfer machine which is moving parts along an automation line, the use of these work supports is difficult if not impossible due to the clearance needed between the spaced centers for moving the parts from one work station to another down the transfer line. A so-called "lift and carry" mechanism lifts a part from one station, carries it to the next station, and then returns to the first station from which it receives a part.

It is an object of the present invention to provide a system and mechanism for supporting elongate, slender parts between centers for rotation in a machining or grinding function at the same time telescoping a chuck over the part to a position near a portion to be machined and supporting the part at that position in a part-gripping chuck which will also drive the part in rotation. Upon completion of the machining operation, the support chuck is retracted, the centers retracted, and the part transferred down the line to the next work station where it is again mounted between centers and chucked between the ends for a subsequent operation.

In order to finish both ends of the part, the work-swallowing chucks can be positioned at opposite ends of the part. For example, during some station locations, viewed along the direction of travel transverse to the axis of the parts, the chucks can be on the left-hand end of the parts, and, at subsequent stations, the chucks can be on the right-hand end.

A further object is a work support for a slender part which is relatively inexpensive to manufacture and yet completely retractable from the work path in the transfer line.

Other objects and features of the invention will be apparent in the following description and claims taken with the accompanying drawings in which the invention is described together with the details of the manner and process of using it to enable persons skilled in the art to utilize the invention, all in connection with the best mode presently contemplated for the practice of the invention.

BRIEF DESCRIPTION OF THE DRAWINGS

DRAWINGS accompany the disclosure and the various views thereof may be briefly described as follows.

DESCRIPTION OF THE INVENTION AND THE MANNER AND PROCESS OF USING

The present work-holding and support system is intended to be used with an automation line utilizing a transfer system in which individual work parts are moved from one work station to another sequentially in order to have work done on them at each station. In some instances, a synchronized system is utilized in which parts are moved simultaneously from one station to the next in a lift-and-carry motion. In other cases, an accumulating conveyor system is used. An example of such a transfer system is found in a U.S. Pat. No. 3,570,656, to Manetta, which issued on Mar. 16, 1971.

In the present invention, a transfer line is provided with work stations each provided with opposed centers to mount a slender elongate part for rotation. At each station is a machine tool to perform a grinding or machining operation on the part when it is properly mounted between the support centers.

At each station is a support chuck which has a telescoping throat to move out over one end of the part and grip the part between the support centers to support the part and prevent bending during the machining operation.

When viewing the system in the direction of the overall transfer motion, the telescoping throat supports and chucks may be positioned selectively at one end or the other of the parts to allow machining of each end as the part moves down the line. If a less expensive line is desired, the parts may be machined at one end as they move through the line and then turned end-for-end and moved through the same line again to complete both ends.

In the following disclosure, the term "machining" is used in a broad sense to mean cutting with lathe tools, drilling, or grinding or other metal removal processes.

Figure 3:
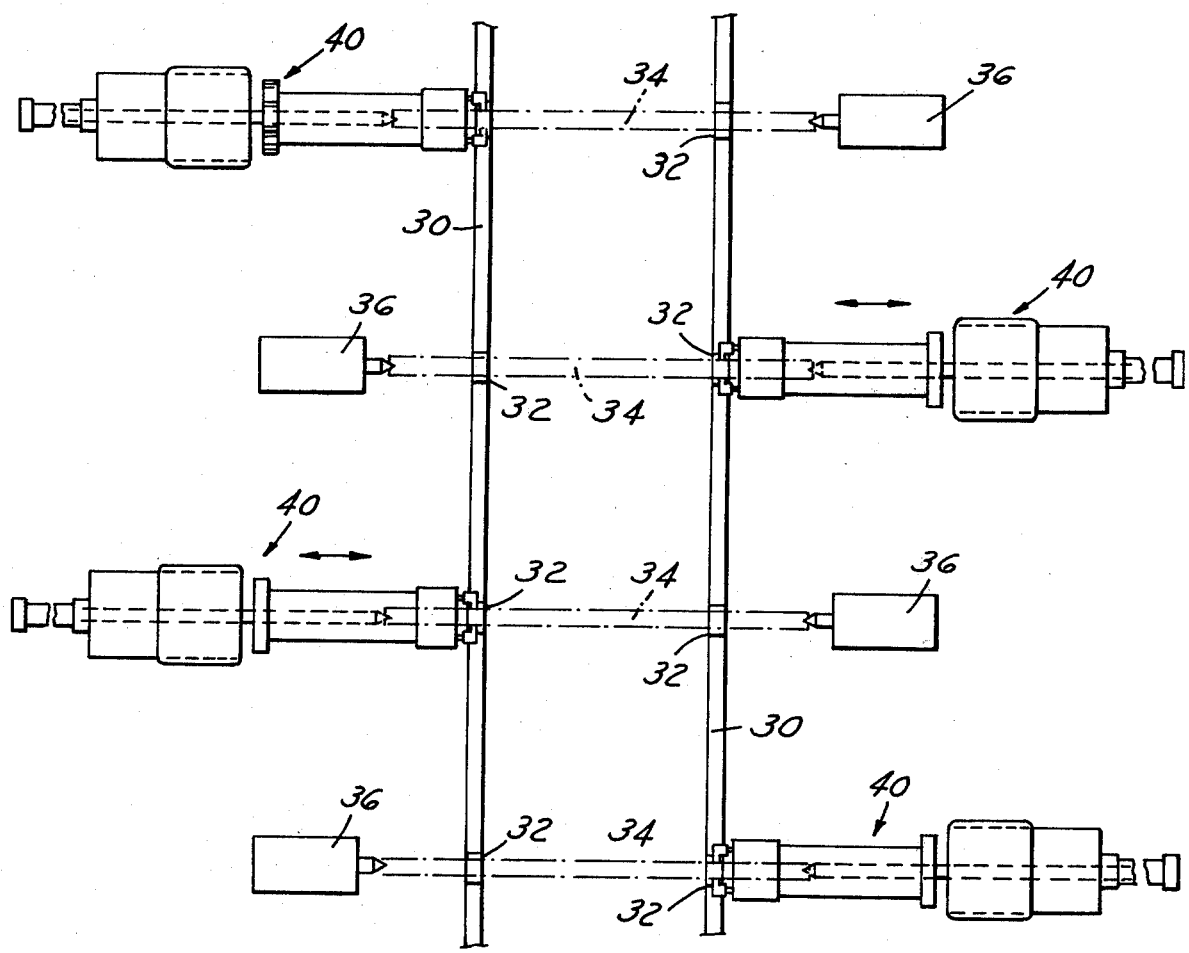
FIG. 3, a schematic view of a transfer system wherein the parts can be moved from one station to another.

With reference to the drawings, in FIG. 3, a schematic showing of a transfer line has two parallel rails 30 with recesses 32 for receiving and carrying work parts 34 which are to be moved from one station to the next in a lift-and-carry motion. Each station has a tailstock center 36 and a headstock assembly 40. Each part is brought to a station by the lift-and-carry bars and held in a position to be engaged by the tailstock and headstock centers, after which the rails 30 will move to a lowered and return position ready for the next pick-up motion.

Figure 1:
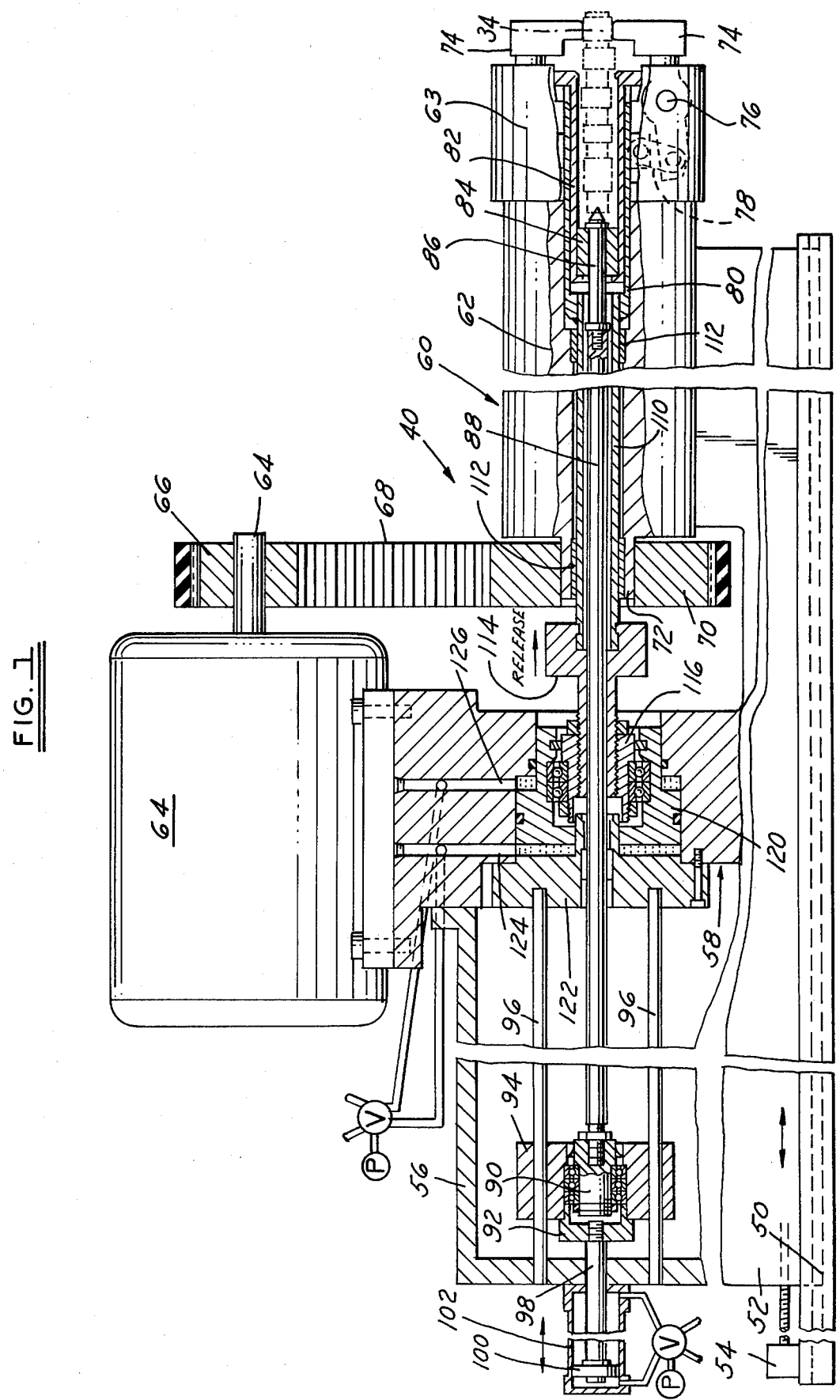
FIG. 1, a sectional view of the chuck and drive foreshortened for clarity of presentation.

The headstock assembly is shown in greatest detail in FIG. 1. A machine tool slide base 50 mounts a slide frame 52 which is moved on the base in a conventional way by a powered ball screw or feed screw mechanism shown diagrammatically at 54 or any mechanical or hydraulic motion. Mounted on one end of the slide frame 52 is a housing 56 abutting a motor mount and piston block 58, and at the other end a cylindrical housing 60 serving as a bearing block for a rotating chuck core sleeve 62 and chuck jaw head 63.

A motor 64, mounted atop the block 58, has a drive shaft 64 and pulley 66 connected by suitable drive such as a timing belt 68 to a pulley 70 which has a driving connection with a hub 72 extending from the chuck core sleeve 62.

At the right-hand end of the rotating chuck core sleeve 62 are mounted self-centering chuck jaws 74 of conventional design pivoted at 76 and actuated by links
:::

78 pivoted at one end to the jaws 74 and at the other end to lugs on an actuator sleeve 80. The actuator sleeve is slidably mounted within a central cylindrical recess in chuck core sleeve 62 and has also a sliding relation with a flanged cup sleeve 82 secured to the chuck core sleeve 62. A guide block 84 mounts the forward end of the headstock center 86 which in turn is mounted and controlled by a long slender rod 88. The rod 88, at its left end, as viewed in FIG. 1, is secured to a bearing hub 90 rotatably mounted with suitable bearings in bearing cup 92 supported in a non-rotatable block 94 slidable on rods 96 in housing 56.

The closed end of bearing cup 92 is secure to one end of a piston rod 98 having a piston 100 in a hydraulic cylinder 102 mounted on housing 56. Suitable hydraulic connections are provided at the ends of the cylinder 102 controlled by a value which can be actuated by any suitable motion responsive mechanism.

Reverting to actuator sleeve 80, the left end, as viewed in FIG. 1, is connected to a draw bar tube 110 surrounding rod 88, this tube being mounted for rotation in bushings 112 and connected at its left hand end to a block 114 having a threaded shaft secured in a hub 116 mounted for rotation by suitable bearings in a stepped piston 120 slidable in a stepped cylinder formed in block 58. The cylinder is closed by a cylinder head 122 secured to block 58. Suitable seals are provided for the piston, and ports 124 and 126 are provided fore and aft of the piston for hydraulic fluid controlled by a suitable valve which can be actuated in a sequential system.

Pressure in port 124 will shift piston 120 to the right to cause draw bar tube 110 and sleeve 80 to move links 78 to release the jaws 74. See FIG. 2. Pressure in port 126 will shift piston 120 to the left and move tube 110 and sleeve 80 to the left to close the jaws 74 on a work part.

Actuation of motor 64 causes the pulley 70 to drive in rotation the core sleeve 62, the chuck jaw head 63 on the core sleeve, the sleeves 80 and 82, the draw tube 110, the center rod 88, the block 114, the hub 116, and the bearing hub 90.

IN THE OPERATION

Viewing FIG. 3, it will be appreciated that the degree to which a particular part is swallowed by the chuck will depend on the length and slenderness of the part. In some cases, the part 34 may be gripped near the center, as shown in FIG. 1, and in other cases it may be gripped nearer the ends.

Figure 2:
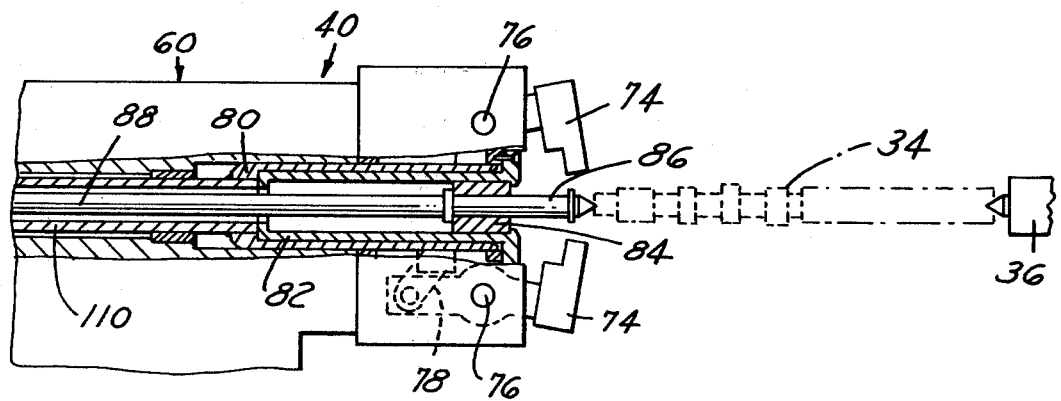
FIG. 2, a view with the chuck retracted from the work part.

In FIG. 2, the part 34 is shown between the tailstock center 36 and the center 86. The center 86 has been advanced by pressure applied to the left-hand end of cylinder 102 and has engaged the workpiece. The transfer mechanism is lowered to clear the part and the headstock. The headstock assembly 52 is now advanced on the slide base 50 by operation of a slide advance mechanism 54. Sufficient continuous pressure is directed to the left-hand end of cylinder 102 so that the center will continue to bear on the part without any bending moment on the workpiece. Meanwhile, the headstock continues to advance and the cup sleeve 82 advances over the part. The chuck head 63 also advances over the part while the part is still carried by the centers. When the slide has advanced to the desired position relative to the part, the headstock assembly stops, and pressure is applied to the port 126 shifting piston 120 to the left. This shifts block 114, draw tube 110, and actuator sleeve 80 to the left, moving links 78 to close the jaws 74 on the work. Sequential actuation of the motor 64 will rotate the work and the other internal parts mounted for rotation so a proper machining action can be accomplished on the part by a tool (not shown) disposed in a proper relationship to the part Upon completion of the machining operation, the port 124 is pressurized against the left-hand end of piston 120 the draw tube is moved to the right to release the jaws 74 as shown in FIG. 2. In proper sequence, the headstock is retracted to expose the part and then the lift bars 30 are moved to a work support position and the cylinder 102 is pressurized on the right hand side of the piston to cause a slight retraction of the center 86, thus releasing the work to the lift-and-carry bar for advance to the next station.

As shown in FIG. 3, the opposite end of a workpiece 34 can be machined at a next station or the various operations can all be performed seriatim on one end and then on the other end.

What I claim is:

1. A method of machining elongate, slender parts which are subject to bending under tool pressure which comprises:
   (a) mounting an elongate part between centers along a transfer line,
   (b) moving a hollow chuck support longitudinally of said mounted part to enclose a portion of said part within said chuck while maintaining said center support,
   (c) actuating jaws on said chuck support to grip said part between the centers to drive the part in rotation,
   (d) rotating said part through said jaws while machining the exposed end,
   (e) releasing said jaws and retracting said chuck support while maintaining said center support to clear a path of transfer motion for said part in a direction transverse to the axis of the part, and
   (f) releasing said part from said centers to permit transfer of said part.

2. A method as defined in claim 1 in which said chuck supports are moved selectively from opposite ends of said parts to achieve machining of both ends of said parts in a transfer line.

3. An apparatus for machining elongate, slender parts which are subject to bending under tool pressure which comprises:
   (a) a tailstock center,
   (b) a slide base in line with said tailstock center,
   (c) a chuck assembly slidable on said slide base, said chuck assembly comprising:
      (1) a hollow rotatable chuck core having a central recess to receive one end of a part in a telescoping relationship,
      (2) a headstock support center within said core slidable in relation to said core to contact a part on an end opposite said tailstock center,
      (3) first means on said chuck assembly to maintain said headstock support center in contact with a part during relative motion of said chuck core on said slide,
      (4) chuck jaws on said chuck core to engage a part to cause rotation of said part on said centers,
      (5) second means to actuate said jaws to a part engaging and release position independent of the motion of said chuck assembly on said slide, and
      (6) third means to retract said headstock center from said part independently of the motion of said chuck assembly, and (d) power means to move said chuck assembly on said base to a first position wherein said chuck core is enclosing a portion of said part prior to the engagement of said chuck jaws and to a second position wherein said chuck core is withdrawn from said part subsequent to the release of said chuck jaws.

4. An apparatus as defined in claim 3 in which said first means comprises a center rod extending through said assembly to one end carrying the headstock center, and means at the other end of said rod to exert pressure against a part during relative motion of said chuck assembly and said rod.

5. An apparatus as defined in claim 3 in which said headstock center is guided in a guide block in said hollow chuck core.

6. An apparatus as defined in claim 4 in which, in said first means, said means to exert pressure is mounted not to rotate and said rod is mounted to rotate with said chuck core and said chuck jaws.

7. An apparatus as defined in claim 4 in which said means to exert pressure against a part comprises a piston-cylinder combination with a piston rod having a rotatable connection with said center rod.

8. An apparatus as defined in claim 3 in which said second means comprises a non-rotatable piston-cylinder combination, a draw bar tube connected with said piston in a rotatable connection, and link means connecting said draw bar tube with said chuck jaws to move to a work-engaging and work release position.

9. An apparatus as defined in claim 8 in which said draw bar tube surrounds and is independently movable in relation to said headstock center rod.

10. An apparatus as defined in claim 3 in which said first and third means comprise a piston-cylinder assembly and means to actuate the piston in one direction to exert pressure on said headstock center and means to actuate the piston in the opposite direction to release said headstock center from a part.

11. An apparatus as defined in claim 3 in which said hollow, rotatable chuck core carries telescoped sleeves including a first sleeve to actuate said chuck jaws in an axial motion, and a second sleeve surrounding and supporting said first sleeve, said second sleeve carrying a guide for the headstock center.

12. An apparatus as defined in claim 3 which includes a multiple station, transfer line positioned to move parts in a direction transverse to the axis of the elongate parts, said chuck assembly being movable axially on said slide base to clear the path of said parts moving from station to station and movable on said base to swallow a portion of a part at a particular station to grip a part between the center supports to stabilize the part during a maching operation.

* * * * *